United States Patent
Sindhu

(10) Patent No.: US 8,699,878 B2
(45) Date of Patent: *Apr. 15, 2014

(54) MULTI-CHASSIS DEVICE WITH MULTIPLEXED OPTICAL INTERCONNECTS

(71) Applicant: Juniper Networks, Inc., Sunnyvale, CA (US)

(72) Inventor: Pradeep Sindhu, Los Altos Hills, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/865,938

(22) Filed: Apr. 18, 2013

(65) Prior Publication Data

US 2013/0230322 A1  Sep. 5, 2013

Related U.S. Application Data

(63) Continuation of application No. 13/284,514, filed on Oct. 28, 2011, now Pat. No. 8,428,458, which is a continuation of application No. 11/832,342, filed on Aug. 1, 2007, now Pat. No. 8,050,559.

(60) Provisional application No. 60/839,252, filed on Aug. 21, 2006.

(51) Int. Cl.
*H04J 14/00* (2006.01)

(52) U.S. Cl.
USPC ............... 398/49; 398/45; 398/50; 398/51; 398/47; 398/54; 370/351; 370/392; 370/389; 370/388; 370/218; 385/24; 385/16; 385/17; 385/18; 709/231; 709/238; 709/242

(58) Field of Classification Search
USPC ........... 398/45, 46, 47, 48, 49, 50, 51, 52, 53, 398/54, 55, 56, 57, 79, 82, 75, 83, 60, 58, 398/59; 370/351, 392, 389, 388, 218, 223, 370/225, 226, 228, 352, 400, 221, 395.1, 370/395.4; 385/24, 16, 17, 18; 709/231, 709/238, 223, 239, 242

See application file for complete search history.

(56) References Cited

U.S. PATENT DOCUMENTS 4,901,308 A  2/1990  Deschaine
5,297,233 A  3/1994  Lerminiaux (Continued)

FOREIGN PATENT DOCUMENTS

CN  1193124  9/1998
EP  0497667  8/1992

(Continued)

OTHER PUBLICATIONS

Jonathan S. Turner and Riccardo Melen, "Multirate Clos Networks," IEEE Communications Magazine, Oct. 2003, 11 pgs.

(Continued)

*Primary Examiner* — Hanh Phan
(74) *Attorney, Agent, or Firm* — Shumaker & Sieffert, P.A.

(57) ABSTRACT

A multi-chassis network device includes a plurality of nodes that operate as a single device within the network and a switch fabric that forwards data plane packets between the plurality of nodes. The switch fabric includes a set of multiplexed optical interconnects coupling the nodes. For example, a multi-chassis router includes a plurality of routing nodes that operate as a single router within a network and a switch fabric that forwards packets between the plurality of routing nodes. The switch fabric includes at least one multiplexed optical interconnect coupling the routing nodes. The nodes of the multi-chassis router may direct portions of the optical signal over the multiplexed optical interconnect to different each other using wave-division multiplexing.

26 Claims, 7 Drawing Sheets

(56) References Cited

U.S. PATENT DOCUMENTS

| | | | |
|---|---|---|---|
| 5,309,266 | A | 5/1994 | Jacob et al. |
| 6,208,440 | B1 | 3/2001 | Jang |
| 7,209,657 | B1 | 4/2007 | Islam |
| 7,274,702 | B2 | 9/2007 | Toutant et al. |
| 8,050,559 | B2 * | 11/2011 | Sindhu ............... 398/49 |
| 8,428,458 | B2 * | 4/2013 | Sindhu ............... 398/49 |
| 2004/0052527 | A1 | 3/2004 | Kirby |
| 2005/0105905 | A1 * | 5/2005 | Ovadia et al. ........ 398/47 |
| 2006/0008273 | A1 * | 1/2006 | Xue et al. ............ 398/51 |
| 2006/0050702 | A1 | 3/2006 | Matsui et al. |

FOREIGN PATENT DOCUMENTS

| | | |
|---|---|---|
| EP | 0 814 629 A2 | 12/1997 |
| GB | 2 320 152 | 6/1998 |
| WO | WO 98/25436 | 6/1998 |
| WO | WO 02/098086 A1 | 12/2002 |

OTHER PUBLICATIONS

"An Slightly Edited Local Copy of Elements of Lectures 4 and 5," The Technology of Cyberspace, ENGS4, Thayer School of Engineering, Dartmouth College, Jan. 15, 1998, 5 pgs.

Marc S. Walker, "Multistage Distribution Switching Systems: Clos and Beyond," SMPTE Journal, Dec. 1991, pp. 946-954.

Partial European Search Report from corresponding European Application No. EP 07 25 3247, dated Oct. 8, 2007, 4 pgs.

European Search Report dated Dec. 3, 2007, for corresponding European Application No. 07 25 3247, 16 pgs.

EPO Communication dated Apr. 20, 2009 for corresponding European Application No. 07 253.247.6, 3 pgs.

Office Action from European application No. 07253247.6 dated Nov. 30, 2010, 6 pp.

Extended Search Report from European application No. 10011047.7, dated Nov. 24, 2010, 8 pp.

Notification of First Office Action for Chinese Application No. 200710145296.6 mailed Jan. 8, 2010, 7 pp.

Instruction letter to Associate dated May 18, 2010, in response to the First Office Action for Chinese Application No. 200710145296.6 dated Jan. 8, 2010, 6pp.

Notification of Second Office Action for Chinese Application No. 200710145296.6 dated Jul. 9, 2010, 14 pp.

Notification of Third Office Action from Chinese application No. 200710145296.6, dated Dec. 14, 2010, 7 pp.

Notification of Fourth Office Action from Chinese application No. 200710145296.6, dated Sep. 15, 2011, 10 pp.

Office Action received in corresponding CN Application No. 200710145296.6, mailed Sep. 15, 2011, 10 pgs.

Notification of the First Office Action mailed Mar. 18, 2013 in corresponding CN Application No. 201110086604.9, 12 pgs.

* cited by examiner

MULTI-CHASSIS DEVICE WITH MULTIPLEXED OPTICAL INTERCONNECTS

This application is a continuation of U.S. application Ser. No. 13/284,514 filed Oct. 28, 2011, U.S. application Ser. No. 11/832,342 filed Aug. 1, 2007, now U.S. Pat. No. 8,050,559, which claims the benefit of U.S. Provisional Application No. 60/839,252, filed Aug. 21, 2006. Each of these applications is incorporated by reference herein.

TECHNICAL FIELD

The invention relates to computer networks and, more particularly, to routing packets within computer networks.

BACKGROUND

A computer network is a collection of interconnected computing devices that can exchange data and share resources. In a packet-based network, such as an Ethernet network, the computing devices communicate data by dividing the data into variable-length blocks called packets, which are individually routed across the network from a source device to a destination device. The destination device extracts the data from the packets and assembles the data into its original form.

Certain devices, referred to as routers, maintain routing information representative of a topology of the network. The routers exchange routing information so as to maintain an accurate representation of available routes through the network. A "route" can generally be defined as a path between two locations on the network. Upon receiving an incoming data packet, a router examines information within the packet, often referred to as a "key," to select an appropriate next hop to which to forward the packet in accordance with the routing information.

In general, service providers, such as an Internet service provider providing network services within the core of the Internet, continue to struggle to meet increasing bandwidth demands. One way to meet increasing bandwidth needs is to use "multi-chassis" routers. A multi-chassis-router is a router in which multiple routing nodes are physically coupled and configured to operate as a single routing node. One example of a multi-chassis router includes multiple line card chassis (LCCs), which include one or more interface cards (IFCs) for sending and receiving packets, and a central switch control chassis (SCC), which provides top-down management of the LCCs. This type of multi-chassis router is often referred to as a single-headed multi-chassis router, i.e., a routing system in which all routing computations are done on a single routing engine that is designated as the master of the routing system. To peer routers on the network, the multi-chassis router appears as a single routing node. Because multi-chassis routers combine resources of multiple routing devices, multi-chassis routers have much higher bandwidth capabilities than standalone routers. For example, the use of multi-chassis routers can simplify and improve routing on a service provider network by consolidating routing functions onto fewer routers.

SUMMARY

In general, a multi-chassis router is described in which the routing nodes of the multi-chassis router are coupled using multiplexed optical interconnects. A multi-stage switch fabric, such as a 3-stage Clos switch fabric, relays packets between the routing nodes. The stages of the switch fabric may be distributed to the individual routing nodes of the multi-chassis router, and the multiplexed optical interconnects forward the packets between the nodes.

For example, the multi-chassis router may include a plurality of line card chassis (LCCs) that cooperate so as to operate as a single router within a network without including a distinct, centralized switch fabric. Implementation of the multi-stage switch fabric may be distributed to the LCCs, and the LCCs may communicate using multiplexed communications over the optical interconnects. Alternatively, one or more central switch nodes, such as a central switch control chassis, may be incorporated within the multi-chassis router. In either case, use of multiplexed communications may reduce an overall length of cable necessary to implement the switch fabric, and may reduce the number of cable interfaces required on each LCC. As a result, the multi-chassis router may more easily be scaled to incorporate an increased number of routing nodes without reaching or exceeding any physical size limits within an environment in which the multi-chassis router is to be deployed.

In one example embodiment, the invention is directed to multi-chassis router comprising a plurality of routing nodes that operate as a single router within a network and a switch fabric that forwards packets between the plurality of routing nodes. The switch fabric includes at least one multiplexed optical interconnect coupling the routing nodes.

In another embodiment, the invention is directed to a multi-chassis router comprising a plurality of N routing nodes that operate as a single router within a network and a multi-stage switch fabric having M stages that forwards packets between the plurality of routing nodes. The multi-chassis router also includes N*(M-1) multiplexed point-to-point data interconnects coupling the data planes of routing nodes via the switch fabric.

In another example embodiment, the invention is directed to a fiber-optic cable for connecting a plurality of routing nodes in a multi-chassis router. The fiber optic cable comprises a cable input to receive an optical signal from a first routing node of the plurality of routing nodes and a plurality of optical taps to output a portion of the optical signal to each of the remaining routing nodes. The plurality of optical taps divide an optical power of the optical signal substantially equally among the remainder of the plurality of routing nodes.

In another example embodiment, the invention is directed to set of fiber-optic cables to interconnect N network devices, the set of fiber-optic cables comprising N fiber-optic cables, wherein N is an integer greater than or equal to 2. Each of the N fiber-optic cables includes an input for receiving an optical signal from a first one of the N network devices and N-1 optical taps for outputting the optical signal to the N-1 remaining network devices. The N-1 optical taps divide the optical signal to output substantially equal portions of the optical signal to the N-1 remaining network devices.

In another example embodiment, the invention is directed to a method comprising receiving a packet at one of a plurality of routing nodes of a multi-chassis router, selecting a wavelength based on information within the packet, wherein the wavelength corresponds to one of the routing nodes within the multi-chassis router, and transmitting the packet via an optical signal having the selected wavelength from a first one of the routing nodes of the multi-chassis router to a second one of the routing nodes via a switch fabric having an optical interconnect.

In another example embodiment, the invention is directed to a network device comprising a plurality of forwarding nodes and a set of multiplexed optical interconnects coupling the forwarding nodes. The network device connects other devices on a network.

In another embodiment, the invention is directed to a plurality of network devices coupled to a network and a multi-chassis network device connecting the plurality of network devices on the network. The multi-chassis network device includes a plurality of nodes that operate as a single device within the network, and a switch fabric that forwards data plane packets between the plurality of nodes. The switch fabric includes a set of multiplexed optical interconnects coupling the nodes.

Embodiments of the invention may provide one or more advantages. For example, the described techniques provide alternatives to multi-chassis routers that include centralized switch fabrics within dedicated chassis. Without dedicated chassis containing centralized switch fabrics, each chassis within multi-chassis routers may include external network interfaces. The described techniques allow scaling of multi-chassis routers without the bandwidth capacity limitations of centrally located switch fabrics and without limits due to the number of cable connector jacks that can physically fit on single central chassis. The multiplexing techniques consolidate multiple logical connections among LCCs in multi-chassis routers, thereby reducing the number of cable connector jacks and the number of cables required to connect LCCs to each other. This reduces the physical complexity of multi-chassis routers and increases the physical space available for other uses, such as external network interfaces.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
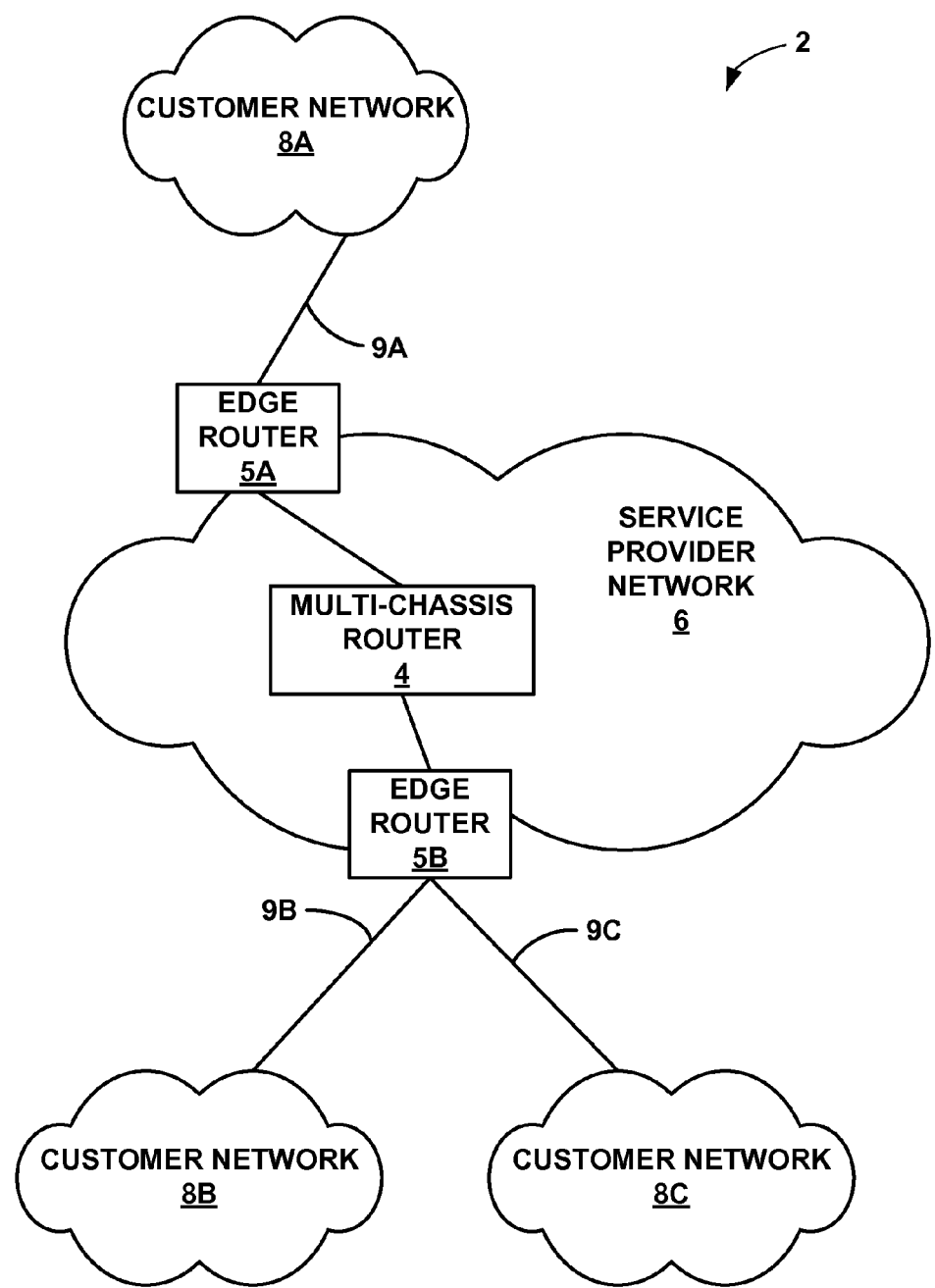
FIG. 1 is block diagram of an example computing environment in which a service-provider network includes a multi-chassis router.

FIG. 1 is a block diagram illustrating an example network environment 2 in which service provider network 6 includes a multi-chassis router 4. For purposes of example, the principles of the invention are described with respect to a simplified network environment 2 of FIG. 1 in which multi-chassis router 4 communicates with edge routers 5A and 5B ("edge routers 5") to provide customer networks 8A-8C ("customer networks 8") with access to network 6. Multi-chassis router 4 may exchange routing information with edge routers 5 in order to maintain an accurate representation of the topology of network environment 2. Multi-chassis router 4 may consist of a plurality of cooperative routing components operating as a single node within service provider network 6.

Although not illustrated, service provider network 6 may be coupled to one or more networks administered by other providers, and may thus form part of a large-scale public network infrastructure, e.g., the Internet. Consequently, customer networks 8 may be viewed as edge networks of the Internet. Service provider network 6 may provide computing devices within customer networks 8 with access to the Internet, and may allow the computing devices within customer networks 8 to communicate with each other. In another example, service provider network 6 may provide network services within the core of the Internet. In either case, service provider network 6 may include a variety of network devices (not shown) other than multi-chassis router 4 and edge routers 5, such as additional routers, switches, servers, or other devices.

In the illustrated example, edge router 5A is coupled to customer network 8A via access link 9A, and edge router 5B is coupled to customer networks 8B and 8C via access links 9B and 9C, respectively. Customer networks 8 may be networks for geographically separated sites of an enterprise. Customer networks 8 may include one or more computing devices (not shown), such as personal computers, laptop computers, handheld computers, workstations, servers, switches, printers, customer data centers or other devices. The configuration of network environment 2 illustrated in FIG. 1 is merely exemplary. For example, service provider network 6 may be coupled to any number of customer networks 8. Nonetheless, for ease of description, only customer networks 8A-8C are illustrated in FIG. 1.

Consistent with the principles of the inventions, multi-chassis-router 4 includes multiple routing nodes (not shown in FIG. 1) that are physically coupled and configured to operate as a single routing node. That is, to peer edge routers 5 of network environment 2, multi-chassis router 4 appears as a single routing device. For example, although multi-chassis router 4 includes a plurality routing nodes, from the perspective of peer routers 5 multi-chassis router 4 has a single network address and maintains single peer routing sessions for each routing protocol maintaining peer routing sessions with each of the edge routers 5.

As described in further detail below, the multiple routing nodes of multi-chassis router 4 forward packets, i.e., network traffic, on a data plane of multi-chassis router 4 using multiplexed optical interconnects. Control plane communications between the multiple routing nodes of multi-chassis router 4 may also occur using multiplexed optical interconnects or by other means. Multi-chassis router 4 includes a multi-stage switch fabric, such as a 3-stage Clos switch fabric, that relay packets between the routing nodes via the optical interconnects using multiplexed communications. As used herein the term packet refers to data units of both fixed-length and variable-length. In different configurations only fixed-length data units, only variable-length data units, or both fixed-length and variable-length data units may be relayed between the routing nodes.

In one example configuration, the stages of the switch fabric may be distributed among the individual routing nodes of the multi-chassis router in a decentralized manner. For example, the multi-chassis router may include a plurality of line card chassis (LCCs) that cooperate so as to operate as a single router within a network without including a distinct, centralized switch fabric. Implementation of the multi-stage switch fabric may be distributed to the LCCs, and the LCCs may communicate using multiplexed communications. Alternatively, one or more central switch nodes, such as a switch control chassis (SCC), may be incorporated within the multi-chassis router. In either case, use of multiplexed communications between the routing nodes may provide certain advantages. For example, use of multiplexed communications reduces the overall length of cable necessary to implement the switch fabric interconnecting the nodes. Moreover, the multiplexed communications may reduce the number of cable interfaces required on each routing node. As a result, multi-chassis router 4 may more easily be scaled to incorporate an increased number of routing nodes without reaching or exceeding any physical size limits within an environment in which the multi-chassis router is to be deployed.

Figure 2:
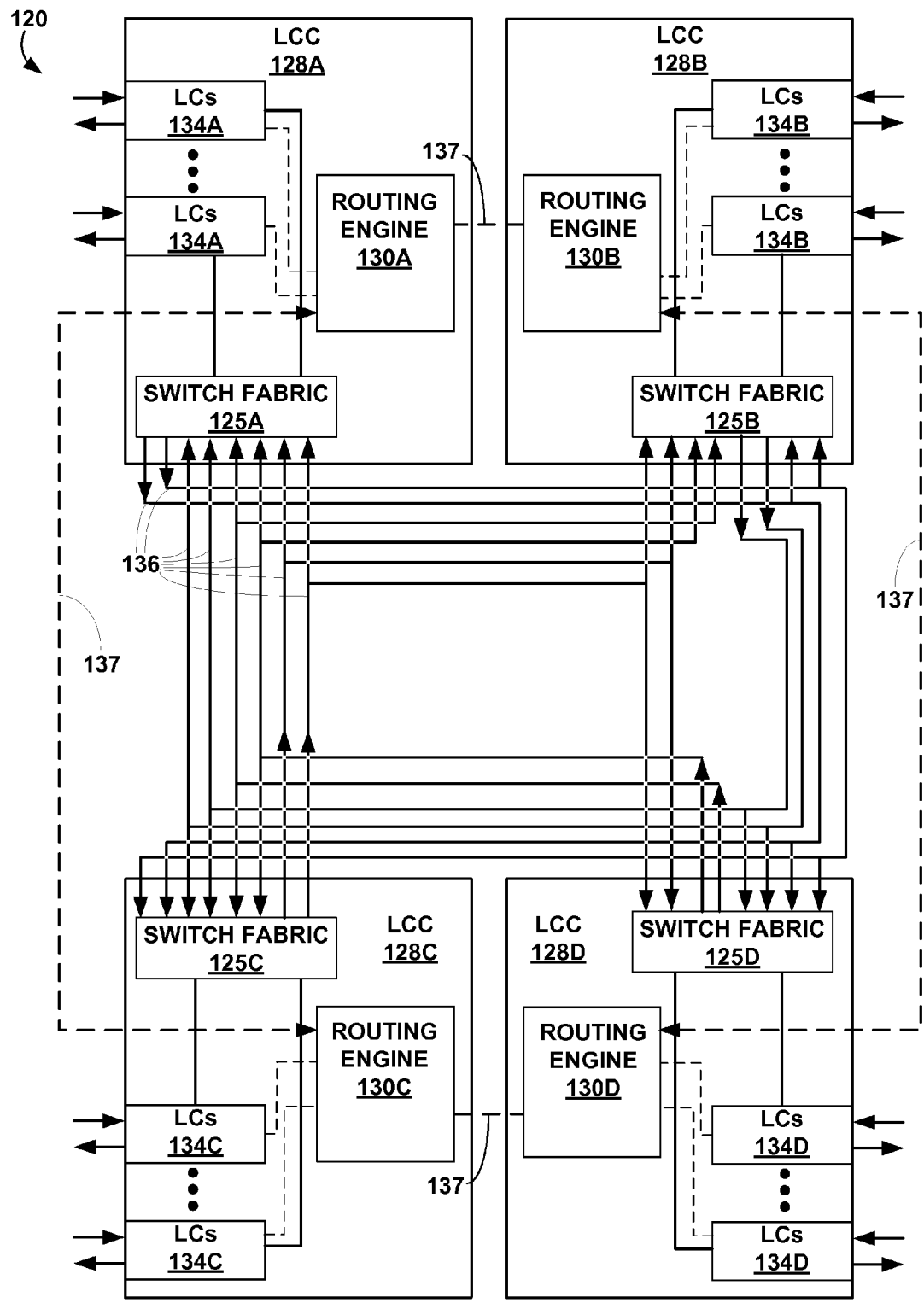
FIG. 2 is a block diagram illustrating an exemplary multi-chassis router.

FIG. 2 is a block diagram illustrating an exemplary multi-chassis router 120 that routes data packets between network devices across a network. Multi-chassis router 120 may, for example, represent an illustration of multi-chassis router 4 of FIG. 1 in further detail.

As shown in FIG. 2, multi-chassis router 120 includes a plurality of cooperative routing components operating as a single node within the network. In this example, multi-chassis router 120 comprises four substantially identical LCCs 128A-128D ("LCCs 128"). In other embodiments, a multi-chassis router may include more or fewer LCCs, and may also include a central routing node to connect the LCCs.

LCCs 128 may each be configured with a set of line cards 134A-134D ("LCs 134"), each of which may include a packet forwarding engine (PFE) and a set of one or more individual interface cards (IFCs) (not shown) for inbound and outbound network communication. In this example, each of LCCs 128 also contain one of routing engines 130A-130D ("routing engines 130"), and electronics for implementing portions of switch fabric 125A-125D ("switch fabric 125").

Switch fabric 125 provides a multi-stage switch to forward packets between LCCs 128. As described herein, switch fabric 125 includes multiplexed optical interconnects 136 that interconnect the portions of switch fabric 125A-125D distributed to the individual LCCs 128. In this example, multiplexed optical interconnects 136 consist of two sets of N fiber-optic cables interconnecting LCCs 128, where N represents the number of LCCs, i.e., N=4 in this example. That is, in this example, each set of the fiber optic cables includes four fiber optic cables, with one of the four fiber optic cables connected to a multiplexed optical output on each of LCCs 128. In one example, switch fabric 125 is a three-stage switch fabric, and each of LCCs 128 includes a portion of each of the three stages. The first set of fiber-optic cables within multi-chassis router 120 connects stage 1 of each LCC 128A to stage 2 of each LCC. The second set of fiber-optic cables used within multi-chassis router 120 connects stage 2 of each LCC 128 to stage 3 of each LCC. As shown in further detail below, for each stage of the switch fabric, a given LCC 128, such as LCC 128A, may communicate with each of the other LCCs, such as LCCs 128B-128D, by outputting multiplexed communications using a single optical cable. In this manner, instead of $2N^2$ optical cables, only 2N optical cables may be needed to provide a 3-stage switch fabric interconnecting N routing nodes (LCCs 128) within multi-chassis router 120. In other embodiments, more or less cables may be used to connect the different portions of switch fabric 125.

Continuing with the example of FIG. 2, multiplexed optical interconnects 136 include a total of eight fiber optic cables. For example, each of the eight fiber-optical cables may be substantially similar to optical interconnect 136A of FIG. 3. Switch fabric 125 for each of LCCs 128 includes two multiplexed optical outputs, i.e., one output for communications from the first stage of the switch fabric to the second stage, and one output for communications from the second stage to the third stage. Each of the eight multiplexed optical outputs for the four LCCs 128 connects to a different one of the eight optical interconnects 136. LCCs 128 each also have six inputs to receive signals from the other LCCs 128. Each cable includes three optical taps which distribute an optical signal to the inputs of the other LCCs 128. In some embodiments, the optical taps of a cable are configured to output substantially equal portions of the optical signal among all the optical taps connected to the cable. In one embodiment, LCCs 128 output multiplex communications by transmitting different wavelength channels of the same optical signal. Wavelength channels destined for to a particular one of LCCs 128 are optically isolated at that one LCCs 128 to separate the relevant channels from the optical channels for the other LCCs 128. Other forms of multiplexing may be used, such as time division multiplexing (TDM).

Routing engines 130A-130D ("routing engines 130") control packet forwarding throughout multi-chassis router 120. Separate cables 137 may be used to share control plane information between routing engines 130. For example, routing engines may communicate with each other via cables 137 to exchange routing information, state information, configuration data and other information. For example, the routing information may include route data that describes various routes through the network, and also next hop data indicating appropriate neighboring devices within the network for each of the routes. Routing engines 130 update the routing information to accurately reflect the current network topology. Like optical interconnects 136, which is used to relay data plane traffic between the LCCs 128, cables 137 may be multiplexed optical interconnects.

Routing engines 130 also use the routing information to derive forwarding information bases (FIBs). Routing engines 130 install FIBs in each of LCC 128. An FIB for one of LCCs 128 may be the same or different than an FIB for other LCCs 128. Routing engines 130 may communicate via cables 137 to coordinate FIB installation. Because cables 137 provide a dedicated connection, i.e., separate from a data packet forwarding connection provided by multiplexed optical interconnects 136, between LCCs 128, FIBs in routing engines 130 can be updated without interrupting packet forwarding performance of multi-chassis router 120.

The following example illustrates the packet forwarding operations of multi-chassis router 120. An incoming packet is first received from a network by one of the IFCs of an LC 134, e.g., LC 134B, which directs it to one of its PFEs, referred to hereafter as the receiving PFE. The receiving PFE then determines a next hop for the data packet using the FIB provided by the routing engine on the LCC, e.g., routing engine 130B. If the data packet is destined for an outbound link on the same one of LCCs 128 as the IFC that initially received the packet, the receiving PFE forwards the packet to the outbound link. In this manner, packets sent out by the same PFE on which they were received from the network bypass switch fabric 125.

Otherwise, the receiving PFE sends the data packet to switch fabric 125, where it is distributed to the proper outgoing LCC, one of LCCs 128. In the outgoing one of LCCs 128, the data packet is forwarded to an outgoing PFE. In some embodiments a data packet is divided into smaller fixed-length data units at the receiving PFE. The fixed-length data units may then be separately sent to the outgoing PFE where they are reassembled into the original, larger data packet. The smaller fixed-length data units may not each follow the same path between the receiving PFE and the outgoing PFE. Such embodiments may provide more efficient utilization of switch fabric 125 than embodiments where larger data packets are not divided prior to forwarding over switch fabric 125. The outgoing PFE outputs the data packet to the appropriate next hop via one of the IFCs on one of LCs 134. Thus, an incoming packet received by one of LCCs 128 may be sent by another one of LCCs 128 to a next hop along a route to the packet's ultimate destination. Other multi-chassis routers that operate in a manner consistent with the principles of the invention may use different switching and routing mechanisms.

Multi-chassis router 120 and, in particular, LCCs 128 may include hardware, firmware and/or software, and may include processors, control units, discrete hardware circuitry, or other logic for executing instructions fetched from computer-readable media. Examples of such media include hard disks, Flash memory, random access memory (RAM), read-only memory (ROM), non-volatile random access memory (NVRAM), electrically erasable programmable read-only memory (EEPROM), flash memory, and the like.

While multi-chassis router 120 is described as having four nodes, each holding a portion of a three-stage switch fabric, other embodiments may include more or less nodes and/or a switch fabric having more or less than three stages located on more than one of the nodes. In any of these embodiments, sets of fiber-optic cables may be useful to connect different stages of the switch fabric among different nodes of the multi-chassis router. For example, in a multi-chassis router having N nodes, a first set of N fiber optic cables including one cable for each of the N nodes may be used to couple the first stage of the switch fabric to the second stage. A second set of N fiber optic cables including one cable for each of the N nodes may be used to couple the second stage of the switch fabric to the third stage, thereby resulting in 2N cables for implementing a three-stage switch fabric in the data plane of multi-chassis router 120. Each of the N fiber optic cables may include a single input for receiving an optical signal from a first one of the N nodes and N-1 optical taps for outputting the optical signal to the remaining nodes. Extending this configuration to any switch fabric including M stages, whereby M is at least two, provides M-1 sets of fiber optic cables or, more specifically, a total of N*(M-1) fiber optic cables.

Figure 3:
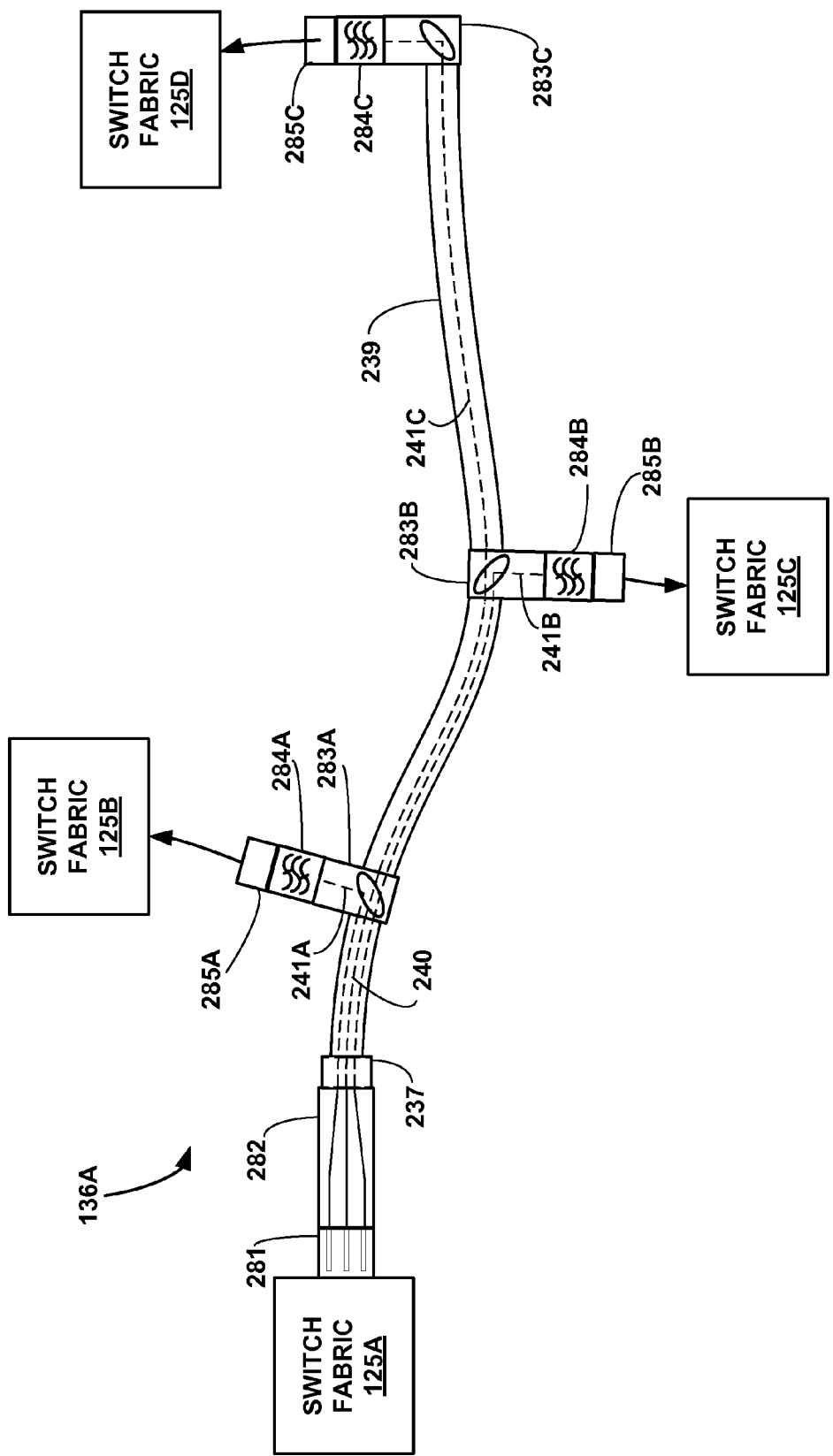
FIG. 3 is a conceptual illustration of a system including a fiber-optic cable that carries a multiplexed signal including multiple channels from one switch fabric to other switch fabrics.

FIG. 3 is a conceptual illustration of a portion of FIG. 2 in further detail and shows switch fabric 125A outputting multiplexed signal 240 over optical interconnect 136A to switch fabrics 125B-125D. Optical interconnect 136A distributes the multiplexed signal to switch fabrics 125B-D via optical taps 283A-283C ("optical taps 283").

Switch fabric 125A includes optical signal emitter 281. Optical signal emitter 281 emits an optical signal including multiple channels having different wavelengths. For example, optical signal emitter 281 may use a different laser for each of the wavelengths. In the example shown in FIG. 3, optical signal emitter 281 is capable of emitting an optical signal including up to three wavelengths—one for each of switch fabrics 125B-D.

The multiple wavelengths are physically combined into a single optical signal 240 in multiplexer 282. From multiplexer 282, optical signal 240 enters fiber optic cable 236 via cable connector 237. Optical signal 240 traverses optical fiber 239 unimpeded until optical signal 240 reaches optical tap 283A. To allow unimpeded passage optical fiber 239 may be made of, for example, glass or plastic having suitable characteristics for optical communications.

Optical tap 283A redirects a first portion 241A of optical signal 240 from optical fiber 239. The first portion 241A of optical signal 240 is the same as the initial optical signal 240 except that the first portion 241A of optical signal 240 has a lower intensity than the initial optical signal 240. The first portion 241A of optical signal 240 passes though wavelength filter 284A, which filters out wavelengths corresponding to communication channels not directed to switch fabric 125B to isolate the optical channel(s) containing information intended for switch fabrics 125B. The wavelength(s) containing information intended for switch fabrics 125B may remain the same, such that filter 284A always isolates the same wavelengths regardless of the content of optical signal 240.

Detector 285A detects the filtered first portion 241A of optical signal 240. For example, detector 285A may be a p-channel, intrinsic, n-channel detector (PIN detector), an avalanche photodiode (APD) or other detector. Detector 285A converts the filtered first portion 241A of optical signal 240 into an electrical signal, which detector 285A communicates to switch fabrics 125B.

After tap 241A, optical signal 240 continues along optical fiber 239 until optical signal 240 reaches optical tap 283B. Optical tap 283B deflects a second portion 241B from optical signal 240. Second portion 241B is filtered by wavelength filter 284B. Like wavelength filter 284A, wavelength filter 284B isolates the channel(s) that include information intended for switch fabrics 125C. Commonly, wavelength filter 284B isolates different channel(s) than wavelength filters 284A and 284C. The filtered second portion 241B is detected by detector 285B, and detector 285B then forwards a corresponding electrical signal to switch fabrics 125C.

After optical tap 283B, portion 241C is all that remains of optical signal 240 in optical fiber 239. The entire portion 241C is collected by optical tap 283C and filtered by wavelength filter 284C. The filtered second portion 241C is detected by detector 285C, and detector 285C then forwards a corresponding electrical signal to switch fabrics 125D.

In an exemplary embodiment, optical taps 283 are configured to divide optical signal 240 substantially equally. In this example, optical tap 283A removes one-third of optical signal 240 and optical tap 283B removes one-half of the remaining two-thirds of optical signal 240. This leaves the remaining one-third of optical signal 240 for optical tap 283C, which consumes all of the remaining one-third of optical signal 240 as portion 241C.

Filters 284A-284C and detectors 285A-285C may be either part of optical interconnect 136A, part of switch fabric 125, or a combination thereof. Similarly, multiplexer 282 may be either part of optical interconnect 136A, part of switch fabric 125A, or a combination thereof.

Figure 4:
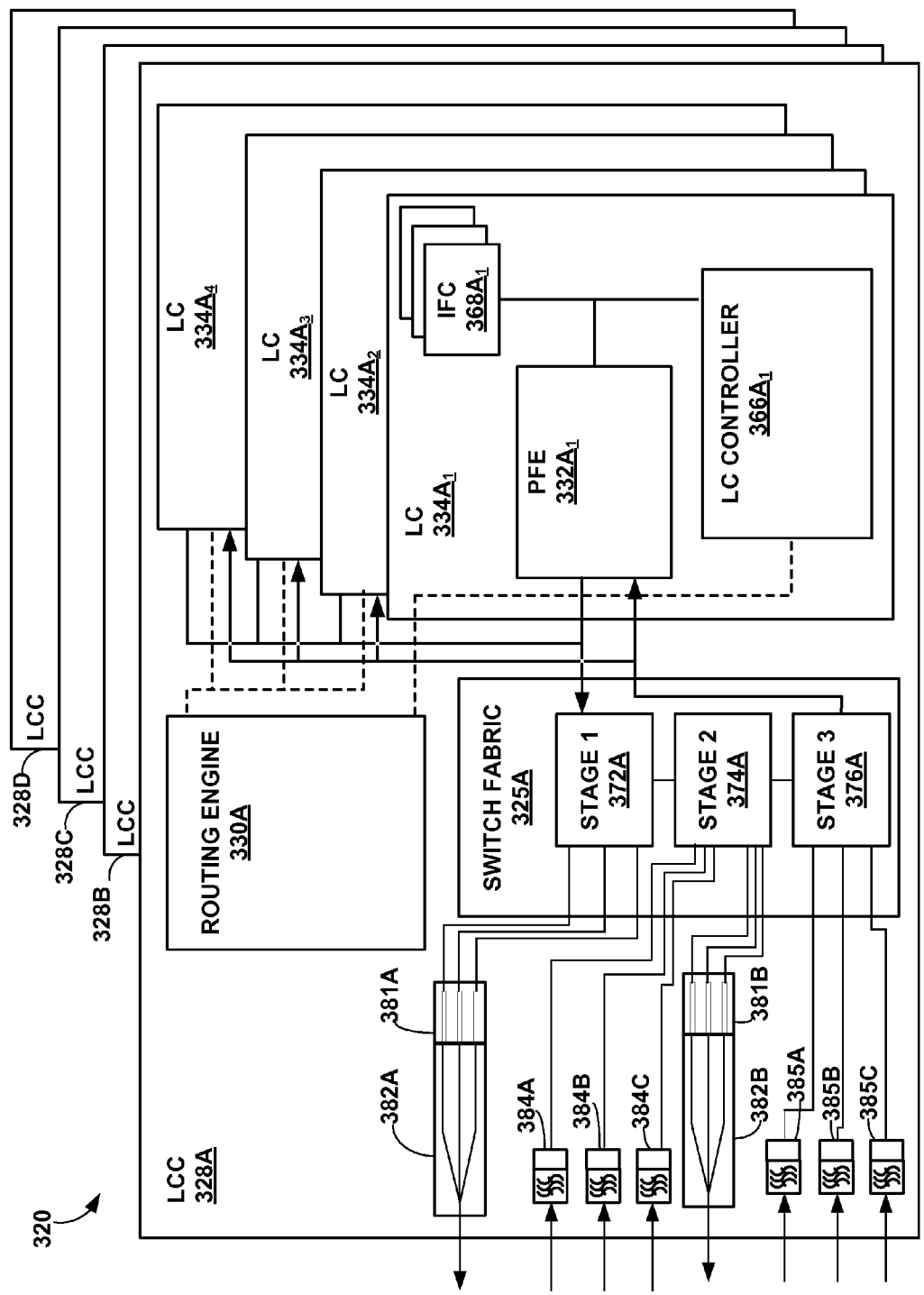
FIG. 4 is a block diagram illustrating in further detail an exemplary line card chassis having a routing engine and a plurality of line cards.

FIG. 4 is a block diagram of an exemplary multi-chassis router 320 including a detailed view of a line card chassis (LCC) 328A, which represents one routing node of the multi-chassis router. The other routing nodes, i.e., LCCs 328B-328D, are typically similar to LCC 328A. Further, multi-chassis router 320 may be similar to or the same as multi-chassis router 120 of FIG. 2. For brevity, details described with respect to multi-chassis router 320 that are the same as with multi-chassis router 120 are not discussed in great detail with respect to FIG. 4.

In this example, LCC 328A includes routing engine 330A and four line cards (LCs) $334A_1$-$334A_4$ ("LCs 334A"). Each LC 334A within LCC 328A includes a packet forwarding engine (PFE) 332A. Each LC 334A further comprises a set of interface cards (IFCs) 368A that provide physical interfaces for receiving and sending packets to an external network. LCs 334A each also include an LC controller 366A that performs control functions within an LC 334A according to instructions from routing engine 330A.

When one of IFCs $368A_1$ on LC $334A_1$ receives an incoming data packet, the IFC $368A_1$ forwards the incoming data packet to PFE 332A$_1$. PFE 332A$_1$ determines if the incoming data packet has a destination that requires the data packet to be forwarded to one of IFCs 368A$_1$ of LCC 328A or a destination that requires the data packet to be forwarded to another IFC within multi-chassis router 320 according to an FIB provided by routing engine 330A. If the incoming data packet is to be output by any of IFCs 368A$_1$ of LCC 328A, PFE 332A$_1$ forwards the data packet to the appropriate one of IFCs 368A$_1$. If not, PFE 332A$_1$ forwards the data packet to switch fabric portion 325A for relaying to a different LCC 328 via the multiplexed optical interconnects.

Switch fabric portion 325A and the similar switch fabric portions residing on LCCs 328B-328D form a three-stage switch fabric. For example, the three-stage switch fabric may be a Clos network including multiple crossbar switches in each stage. Each of LCCs 328A-328D (LCCs 328) includes a portion of each of the three stages. As shown on switch fabric portion 325A, data packets to be related from LC 334A$_1$ are first sent to stage 1 switch 372A for transmission to a stage 2 switch. Stage 1 switch 372A may be a crossbar switch or other switch. In other embodiments, the portion of the stage 1 on LCC 328A may comprise more than one crossbar switch. The other N-1 portions of stage 1 of the switch fabric are similarly located on LCCs 328B-328D.

Once received by stage 1 switch 372A, a packet is directed to the second stage of the switch fabric in one of LCCs 328 of multi-chassis router 320. For example, the data packet may be directed to stage 2 switch 374A, which is located internal to switch fabric portion 325A of LCC 328A, in which case the packet is not relayed to a different on of LCCs 328 via multiplexed optical communications. Otherwise, the data packet is encoded by emitter 381A as an optical signal and transferred to a stage 2 switch fabric portion on one of LCCs 328B-328D by multiplexer 382A. Emitter 381A is controlled to use a wavelength corresponding to a downstream wavelength filter on the one of LCCs 328B-328D for which the data packet is intended.

As shown in FIG. 4, stage 2 switch 374A not only receives packets from switch 372A, but also from similar stage 1 switches located on LCCs 328B-328D. Packets from portions of stage 1 located on LCCs 328B-328D are received via fiber optic cables by inputs 384A-384C ("inputs 384"). Each of inputs 384 is coupled to an optical tap of a different optical cable and receives an optical signal from a different one of LCCs 328B-328D. The optical signals are filtered at inputs 384 to isolate the wavelength(s) corresponding to data packets intended for stage 2 switch 374A. Data packets received at stage 2 switch 374A are either forwarded directly to stage 3 switch 376A or relayed via to stage 3 switches located on LCCs 328B-328D via emitter 381B and multiplexer 382B.

Packets from stage 2 switches located on LCCs 328B-328D are received via fiber optic cables by inputs 385A-385C ("inputs 385"). Like inputs 384, each of inputs 385 is coupled to an optical tap of a different optical cable and receives an optical signal from a different one of LCCs 328B-328D. The optical signals are filtered at inputs 385 to isolate the wavelength(s) corresponding to data packets intended for stage 3 switch 376A.

Stage 3 switch 376A includes discrete outputs (not shown) connecting to each of PFEs 332A on LCs 334A. A packet received by stage 3 switch 376A is directed to the PFE 332A corresponding to the set of IFCs 368A as required by the destination of the packet. For example, if a packet is received by PFE 332A$_1$, PFE 332A$_1$ forwards the packet to one of the set of IFCs 368A$_1$ according to the destination of the data packet.

Figure 5:
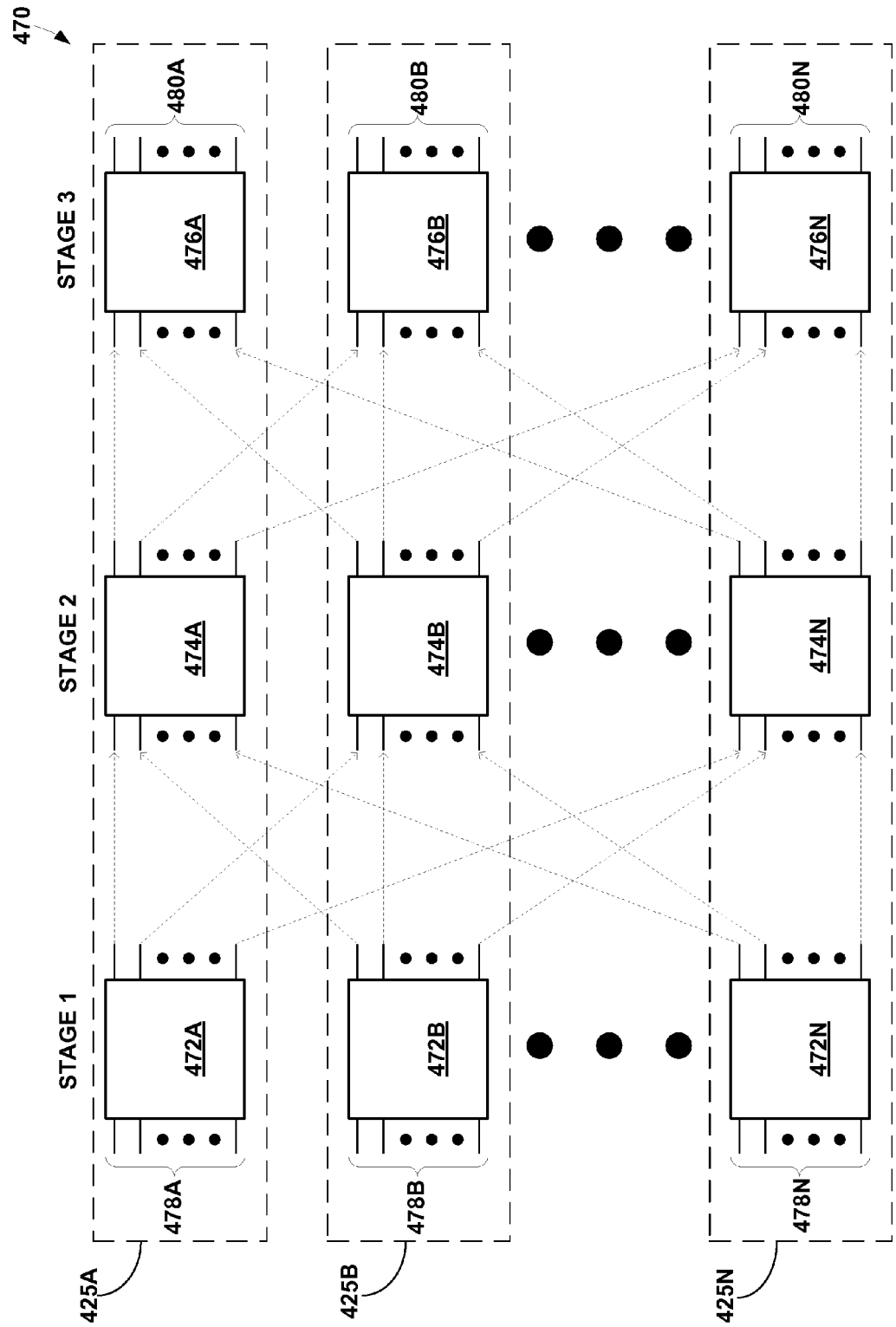
FIG. 5 is a block diagram illustrating a three-stage network.

FIG. 5 is a block diagram illustrating a logical representation of a three-stage switching network 470. For example, three-stage network 470 may logically represent switch fabric 125 of FIG. 2. The three stages of network 470 are distributed across the routing nodes of the multi-chassis router as represented by dashed lines 425A-425N ("routing nodes 425"). The three stages of network 470 include: stage 1 consisting of crossbar switches 472A-472N (collectively "switches 472"), stage 2 consisting of crossbar switches 474A-474N (collectively "switches 474"), and stage 3 consisting of crossbar switches 476A-476N (collectively "switches 476"). Switches 472 receive data packets via inputs 478A-478N (collectively "inputs 478"). Switches 476 relay the data packets via outputs 480A-480N (collectively "outputs 480"). As shown in FIG. 5, each stage of three-stage network 470 includes the same number of crossbar switches. In other embodiments, the stages may include a different number of crossbar switches. For example, stage 2 may include more crossbar switches than either stage 1 or stage 3 to reduce or eliminate the possibility that an open one of inputs 478 could be blocked from an open one of outputs 480. These extra crossbar switches in stage 2 may be located within switch fabrics 425 or elsewhere.

To establish a path through network 470 from one of inputs 478 to the required output 480, the one of switches 472 associated with the receiving input 478 determines an available stage 2 switch that allows a connection path to the stage 3 switch 476 including the required output 480. For example, assume a packet received by switch 472A is to be relayed to one of outputs 480A on switch 476A. Switch 472A selects any of switches 474 with an open connection to both switch 472A and switch 476A. Assume switch 472A selects switch 474B. Once switch 474B receives the data packet, switch 474B determines an available path to switch 476A and forwards the data packet to switch 476A. For example, switch 474B may have more then one open path to switch 476A.

As described herein, the connections between stages utilizes optical multiplexing, and multiple paths originating from the same switch, e.g., the N-1 paths originating from switch 472A to stage 2 switches 474A-N, represent N-1 channels defined by different wavelengths carried by the same optical interconnect. Each switch in network 470 may determine an available path for a packet on-the-fly. In this manner, a data packet received by a switch 472 in stage 1 may go through any of switches 474 in stage 2 to be received by the required switch 476 in stage 3.

While the switch fabric is described as containing a three-stage switch network, in other embodiments switch fabric may contain different switch architecture. For example, the second stage in a three-stage network may be replaced with another three-stage network, thereby forming a five-stage network. Other switch fabric architecture is also possible.

Figure 6:
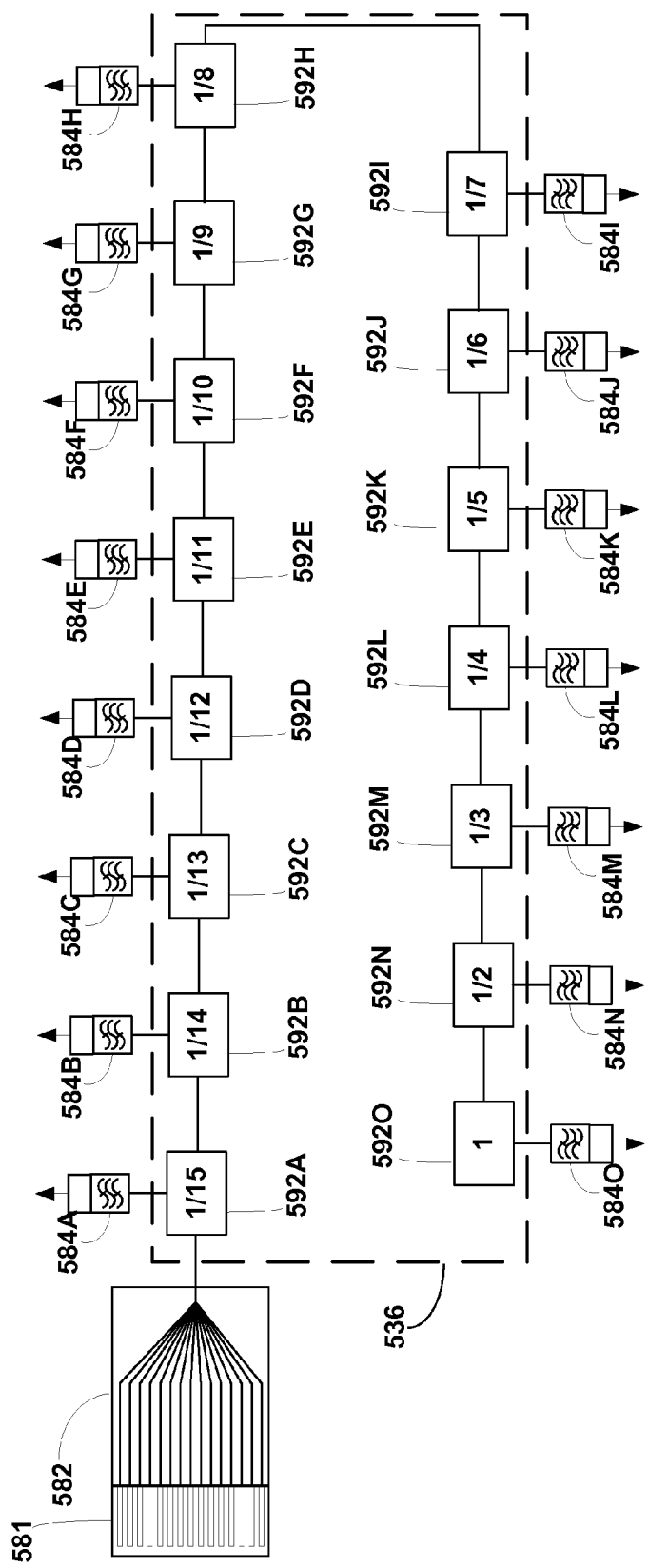
FIG. 6 is an illustration of a fiber-optic cable including multiple optical taps configured to equally divide an optical input signal.

FIG. 6 is an illustration of a single fiber-optic cable 536 for use within a multi-chassis router having sixteen routing nodes, i.e., N=16. In this example, fiber optic cable 526 has fifteen optical taps 592A-592O ("optical taps 592") integral to the optical cable. Optical taps 592 are configured on fiber-optic cable 536 to equally divide the optical power of an optical signal received from emitter 581 and multiplexer 582. Fiber-optic cable 536 is shown coupled to wavelength filter and detector assemblies 584A-584O ("assemblies 584"). Assemblies 584 isolate channels of data included in the optical signal and forward the isolated channel to a network device, such as a node in a multi-chassis router. Because, in this example, there are fifteen optical taps 592, to equally divide an optical signal, each optical tap 592 is designed to remove one-fifteenth of the total signal strength of the original optical signal transmitted by emitter 581.

The configuration to accomplish equal division of the optical signal is as follows. Optical tap 592A removes one-fifteenth of the signal it receives. However, because the signal strength for each of the remaining optical taps 592 is reduced, each subsequent optical tap 592 removes a greater portion of the remaining signal strength. Specifically, each optical tap 592 removes a proportion of the remaining signal strength according to Equation 1:

$$P = 1/N_r$$  (Equation 1)

where P equals the proportion of the optical power to deflect down the optical tap and Nr equals the number of remaining taps of the optical cable.

Equation 1 demonstrates that upstream optical taps need not be accounted for in determining a proportion of an optical signal to remove at any tap. Instead, only the number of remaining downstream optical taps is significant. This means that optical taps on fiber-optic cable 536 may be removed from the end of fiber-optic cable 536 closest to emitter 581 without disturbing the equal distribution of the remaining optical taps 592. Likewise, additional optical taps may be added to the end of fiber-optic cable 536 closest to emitter 581 while maintaining equal distribution between optical taps 592 and any new optical taps. As an example, the first optical tap to be added to the end of fiber-optic cable 536 closest to emitter 581 would need to remove one-sixteenth of the signal strength to have an equal distribution with optical taps 592.

Consequently, as the above example demonstrates, fiber-optic cable 536 may be manufactured in smaller sub-sections. This may be useful in multi-chassis routers upgrades in which new nodes are added to preexisting systems. For example, a multi-chassis router including four nodes may use fiber-optic cables including only three optical taps, e.g., optical taps 592M-592O of FIG. 6. If the multi-chassis router were expanded to include eight nodes, cables with seven optical taps may be required. Sections of fiber-optic cable including four more optical taps, e.g., optical taps 592I-592L could be added to the upstream side of the fiber optic cables to create fiber optic cables with seven optical taps providing equal signal distribution to each of the optical taps, e.g., optical taps 592I-592O. This technique could be used to expand a fiber optical cable to include any number of optical taps while maintaining an equal distribution of an optical signal between all optical taps on the fiber optic cable, as long as the optical signal strength is still adequate, thereby facilitating the scalability of multi-chassis routers.

Figure 7:
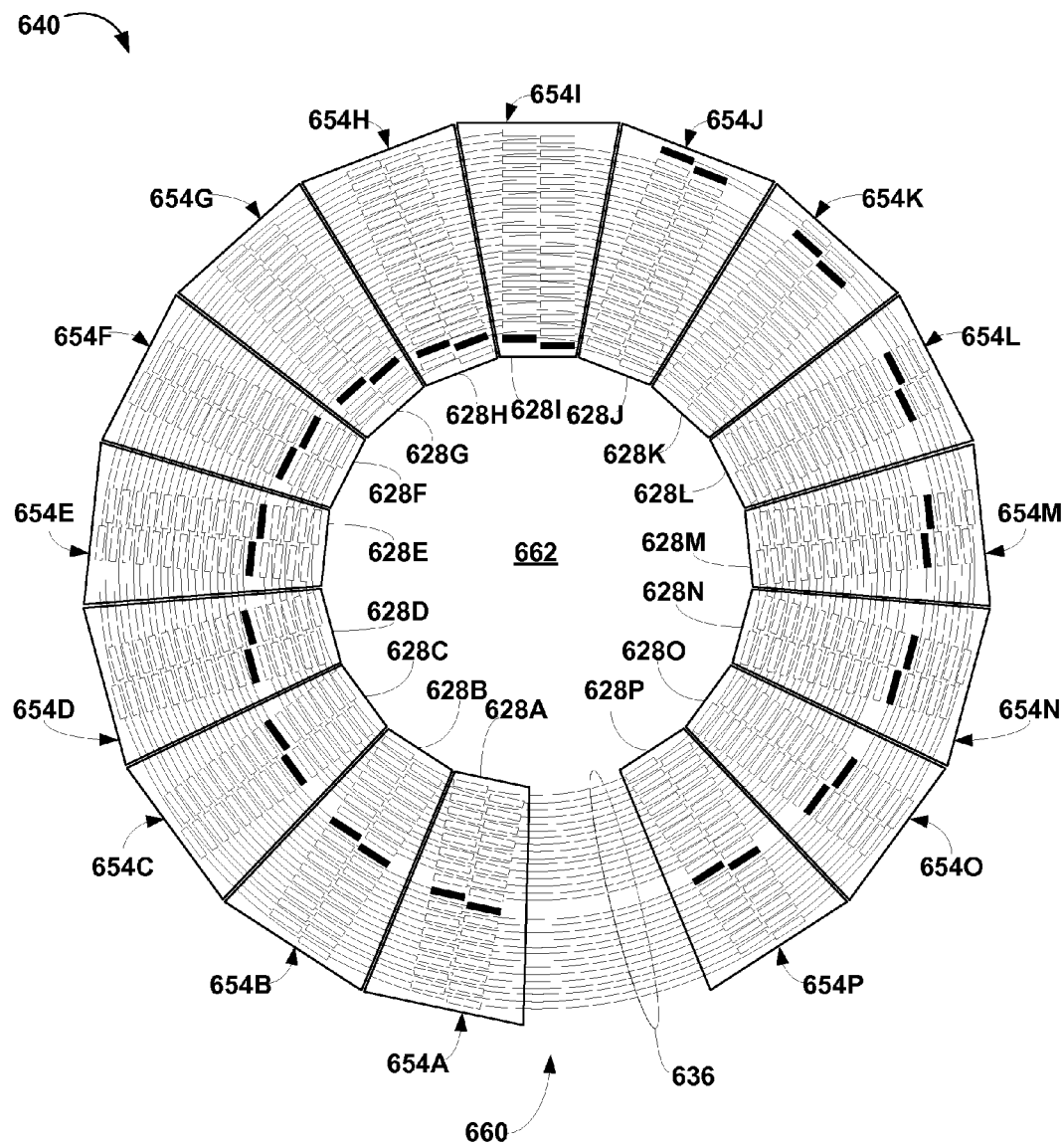
FIG. 7 is a block diagram illustrating an exemplary multi-chassis router including sixteen line card chassis arranged in a circular layout.

FIG. 7 is a top-view illustration of one embodiment in which a multi-chassis router 640 includes sixteen LCCs 628A-628P (LCCs 628) arranged in a circular layout. Multi-chassis router 640 operates in a substantially similar manner as multi-chassis router 120 of FIG. 2. For brevity, details described with respect to multi-chassis router 640 that are the same as with multi-chassis router 120 are not discussed in great detail with respect to FIG. 7.

LCCs 628 utilize a three-stage switch fabric having multiplexed optical interconnects. For example, the three-stage switch fabric may be similar to three-stage network 470 of FIG. 5. The three-stage switch fabric includes multiplexed optical interconnects 636 to connect different portions of the three-stage switch fabric on LCCs 628. In this example, each of LCCs 628 includes two emitters; one emitter emits a multiplexed optical signal for forwarding data packets from stage 1 to stage 2, while the other emitter emits a multiplexed optical signal for forwarding data packets from stage 2 to stage 3. Each of LCCs 628 also includes thirty optical signal inputs—one for each of the two emitters on all the other fifteen LCCs 628.

Each of LCCs 628 has a chassis having a trapezoidal shape such that LCCs 628 can be easily placed in a substantially circular configuration. Multiplexed optical cables manufactured as described herein may be arranged within the inner circle of multi-chassis router 640 to interconnect the switch fabric of LCCs 628. The trapezoidal shape of LCCs 628 also provides a relatively large surface area on exposed sides 654A-654O of LCCs 628. The large surface areas of exposed sides 654A-654O may be useful to locate a large number of slots for insertion of interface cards having physical network interfaces. The trapezoidal shape of LCCs 628 also limits the overall footprint of multi-chassis router 640. Specifically, in this example, the trapezoidal shape of LCCs 628 allows seventeen LCCs 628 to be placed tightly together in a circle. However, multi-chassis router 640 only utilizes sixteen active LCCs 628. This less-than-full-circle configuration provides gap 660, which allows an administrator to easily gain access to the center of multi-chassis router 662, e.g., as may be required during servicing. Other configurations of multi-chassis routers having trapezoidal nodes are also possible, e.g., a multi-chassis router may include two sets of nodes arranged in separate circular configurations and connected by fiber optic cables. As another example, multiple nodes may be stacked one on top of another to form adjacent circular configurations.

Various embodiments of the invention have been described. However, various modifications to the described embodiments may be made within the scope of the invention. For example, while embodiments of the invention have been described with reference to decentralized multi-chassis routers that utilize multiplexed optical interconnects using wave division multiplexing, embodiments of the invention also include single-headed or multi-headed multi-chassis routers. In addition, other multiplexing techniques, such as time divisional multiplexing (TDM) may be employed within the switch fabric of the multi-chassis router. Moreover, the techniques may be applied to a point-to-point communication medium other than optical, provided the point-to-point communication medium has a bandwidth-delay product that substantially exceeds conventional copper transmissions. The term bandwidth-delay product refers to the product of a connection's capacity (in bits per second) times its end-to-end delay (in seconds). The result, an amount of data measured in bits (or bytes), is equivalent to the amount of data "on the air" at any given time, i.e. the number of bytes that have been transmitted but not yet received. A bandwidth delay product for optical may be computed from, for example, a bandwidth of 10 GHz transmitted over hundreds of meters. These and other embodiments are within the scope of the following claims.

The invention claimed is:

1. A multi-chassis device comprising:
   a plurality of nodes that operate as a single device within a network; and
   a switch fabric that forwards packets between the plurality of nodes,
   wherein the switch fabric includes at least one multiplexed optical interconnect coupling the nodes,
   wherein the switch fabric is a multi-stage switch fabric and the multiplexed optical interconnect provides a connection between at least two stages in the multi-stage switch fabric, and
   wherein each of the plurality of nodes comprises an optical emitter that emits a multiplexed optical signal for forwarding packets from a first stage of the switch fabric at a transmitting one of the nodes to a second stage of the switch fabric at the other nodes.

2. The multi-chassis device of claim 1, wherein the multiplexed optical interconnect includes optical taps that distribute an optical signal from the transmitting one of the nodes to the other nodes.

3. The multi-chassis device of claim 2, wherein the optical taps distribute substantially equal portions of the optical signal from the transmitting node to each of the other nodes.

4. The multi-chassis device of claim 1,
wherein the multi-chassis device has N nodes, and
wherein the multiplexed optical interconnect is one of a set of N multiplexed optical interconnects, wherein the set of N multiplexed optical interconnects includes a multiplexed optical interconnect coupled to a respective one of the N plurality of nodes.

5. The multi-chassis device of claim 4,
wherein the switch fabric has M stages, the M stages including the first stage and the second stage,
wherein the set of N multiplexed optical interconnects is a first set of N multiplexed optical interconnects, and
wherein the multi-chassis device includes a total of (M-1) sets of N multiplexed optical interconnects.

6. The multi-chassis device of claim 4, wherein each of plurality of nodes includes an output that sends signals over one of the set of multiplexed optical interconnects to the remainder of the plurality of nodes.

7. The multi-chassis device of claim 1, wherein each of the nodes of the plurality of nodes include a filter to isolate a different wavelength of an optical signal transmitted via the optical interconnect.

8. The multi-chassis device of claim 1, wherein the plurality of nodes comprises line card chassis.

9. The multi-chassis device of claim 1,
wherein the multi-stage switch fabric comprises a plurality of stages, the plurality of stages including the first stage and the second stage, and
wherein each of the nodes of the plurality of nodes includes electronics that implement a portion of each of the stages in the multi-stage switch fabric.

10. The multi-chassis device of claim 9,
wherein the multiplexed optical interconnect includes a fiber optic cable, and
wherein the fiber optic cable provides a connection between the electronics implementing a portion of the first stage in the multi-stage switch fabric at the transmitting one of the nodes and each of the electronics implementing all of the portions of the second stage in the multi-stage switch fabric that are located within the other nodes of the plurality of nodes.

11. The multi-chassis device of claim 1, wherein the transmitting one of the nodes outputs an optical signal to the other nodes via the multiplexed optical interconnect using wave-division multiplexing, time-division multiplexing or code-division multiplexing.

12. The multi-chassis device of claim 1, wherein the multiplexed optical interconnect is arranged in a circle within an interior of the multi-chassis device to interconnect the switch fabric.

13. The multi-chassis device of claim 1, wherein the nodes of the multi-chassis device are arranged in a substantially circular layout.

14. The multi-chassis device of claim 1,
wherein the multiplexed optical interconnect is a passive multiplexed optical interconnect, and
wherein the passive multiplexed optical interconnect directly connects to at least three of the plurality of nodes.

15. A fiber-optic cable for connecting a plurality of nodes in a multi-chassis device comprising:
a cable input to receive an optical signal from an optical emitter of a first node, wherein the optical emitter emits a multiplexed optical signal for forwarding packets from a first stage of a switch fabric of the multi-chassis device to a second stage of the switch fabric at the remaining nodes of the plurality of nodes; and
a plurality of optical taps to output a portion of the optical signal to each of the remaining nodes, wherein each portion of the divided optical signal output by the plurality of optical taps is the same as the optical signal from the first node except that each portion of the divided optical signal output by the plurality of optical taps has a lower intensity than the optical signal from the first node.

16. The fiber-optic cable of claim 15, further comprising a plurality of wavelength filters downstream from the plurality of optical taps to filter a portion of the divided optical signal from the optical taps,
wherein, for each respective optical taps, one of the wavelength filters is positioned between the respective optical tap and a switch fabric of the node associated with the respective optical tap,
wherein each of the plurality of wavelength filters filters out wavelengths corresponding to communication channels not directed to the switch fabric of the associated node in the plurality of nodes, the switch fabric of the associated node being located downstream of its associated wavelength filter.

17. The fiber-optic cable of claim 16, wherein each of the plurality of wavelength filters isolates a different wavelength.

18. The fiber-optic cable of claim 15, wherein the plurality of optical taps divide an optical power of the optical signal substantially equally among the remaining nodes.

19. A method comprising:
receiving a packet at one of a plurality of nodes of a multi-chassis device, the multi-chassis device including a multi-stage switch fabric distributed across the nodes;
selecting a wavelength based on information within the packet, wherein the wavelength corresponds to one of the nodes within the multi-chassis device; and
transmitting the packet via an optical signal having the selected wavelength from a portion of a first stage of the multi-stage switch fabric at a first one of the nodes of the multi-chassis device to a portion of a second stage of the multi-stage switch fabric at a second one of the nodes via a switch fabric having an optical interconnect,
wherein each of the plurality of nodes comprises an optical emitter that emits a multiplexed optical signal for forwarding packets from the first stage of the switch fabric to the second stage of the switch fabric.

20. The method of claim 19, further comprising:
receiving portions of the optical signal with at least two other nodes of the multi-chassis device; and
filtering the portions of the optical signal to isolate wavelengths for the receiving nodes.

21. The method of claim 19, wherein the optical signal incorporates wavelength division multiplexing (WDM).

22. The method of claim 19, wherein the switch fabric is a data plane switch fabric.

23. The method of claim 19, wherein the optical interconnect is a passive optical interconnect that directly connects to at least three of the plurality of nodes.

24. A system comprising:
a plurality of network devices coupled to a network; and
a multi-chassis network device connecting the plurality of network devices on the network, wherein the multi-chassis network device includes:
a plurality of nodes that operate as a single device within the network, and
a multi-stage switch fabric having a plurality of stages that forward data plane packets between the plurality of nodes, wherein the switch fabric includes a set of multiplexed optical interconnects coupling the plurality of stages of the switch fabric,
wherein each of the plurality of nodes comprises an optical emitter that emits a multiplexed optical signal for forwarding packets from a first stage of the switch fabric to a second stage of the switch fabric.

25. The system of claim 24,
wherein the set of multiplexed optical interconnects are a set of passive multiplexed optical interconnects, and
wherein each passive multiplexed optical interconnect in the set of passive multiplexed optical interconnects directly connects to at least three of the plurality of nodes.

26. The system of claim 24,
wherein each node includes electronics that implement a different portion of each of the stages in the multi-stage switch fabric,
wherein the set of multiplexed optical interconnects coupling the nodes includes a plurality of fiber optic cables, and
wherein each fiber optic cable in the plurality of fiber optic cables provides a connection from the portion of one stage in the multi-stage switch fabric at a corresponding node of the plurality of nodes to each of the different portions of a subsequent stage in the multi-stage switch fabric at the other nodes of the plurality of nodes.

\* \* \* \* \*